US009617008B2

(12) United States Patent
Goto et al.

(10) Patent No.: US 9,617,008 B2
(45) Date of Patent: Apr. 11, 2017

(54) AIRCRAFT AND METHOD FOR MOUNTING DEVICE TO BE INSTALLED OUTSIDE AIRCRAFT ONTO AIRFRAME

(71) Applicant: MITSUBISHI AIRCRAFT CORPORATION, Aichi (JP)

(72) Inventors: Shingo Goto, Aichi (JP); Toshiaki Sugimura, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 0 days.

(21) Appl. No.: 14/638,020

(22) Filed: Mar. 4, 2015

(65) Prior Publication Data
US 2016/0039527 A1   Feb. 11, 2016

(30) Foreign Application Priority Data

Aug. 8, 2014  (JP) ................. 2014-162162

(51) Int. Cl.
| *A47B 96/06* | (2006.01) |
| *B64D 15/20* | (2006.01) |
| *B61D 49/00* | (2006.01) |
| *B64C 1/14* | (2006.01) |
| *B64C 1/20* | (2006.01) |
| *B64C 1/36* | (2006.01) |
| *B64D 45/00* | (2006.01) |
| *B64F 5/00* | (2017.01) |
| *B64F 5/60* | (2017.01) |

(52) U.S. Cl.
CPC ............ *B64D 15/20* (2013.01); *B61D 49/00* (2013.01); *B64C 1/1484* (2013.01); *B64C 1/20* (2013.01); *B64C 1/36* (2013.01); *B64D 45/00* (2013.01); *B64F 5/0045* (2013.01); *B64F 5/60* (2017.01)

(58) Field of Classification Search
CPC ........ B64D 47/00; B64D 15/20; B64D 15/16; B64D 15/12; B64D 15/10
See application file for complete search history.

(56) References Cited

U.S. PATENT DOCUMENTS

| 3,607,085 | A | * | 9/1971 | Fusco | ................ | G01N 33/0013 |
| | | | | | | 204/156 |
| 5,531,403 | A | * | 7/1996 | Tyler | ..................... | B64D 47/08 |
| | | | | | | 244/118.1 |
| 7,958,813 | B1 | * | 6/2011 | Serkland | .................. | B64D 7/04 |
| | | | | | | 244/118.1 |

(Continued)

FOREIGN PATENT DOCUMENTS

JP     2007-521463 A     8/2007

*Primary Examiner* — Amy Sterling
(74) *Attorney, Agent, or Firm* — Pearne & Gordon LLP

(57) ABSTRACT

The present invention aims to provide a structure which can reduce the scale of modification of an airframe and allows a device to be installed outside the aircraft to be easily mounted onto the airframe. An aircraft includes, as a structure for mounting a measuring device to be installed outside the aircraft onto the airframe: an arm which penetrates the airframe inwardly and outwardly through a window, and has a portion to be provided with the measuring device and a portion located inside the aircraft; seat rails which support seats disposed inside the aircraft; and a mount which is connected with the arm inside the aircraft and transmits a load input from the arm to the seat rails.

16 Claims, 12 Drawing Sheets

(56) References Cited

U.S. PATENT DOCUMENTS

| | | | |
|---|---|---|---|
| 8,381,630 B2* | 2/2013 | Pancotti | F41A 9/79 244/129.1 |
| 2008/0218385 A1 | 9/2008 | Cook et al. | |
| 2012/0119052 A1* | 5/2012 | Huber | B64D 9/003 248/429 |

* cited by examiner

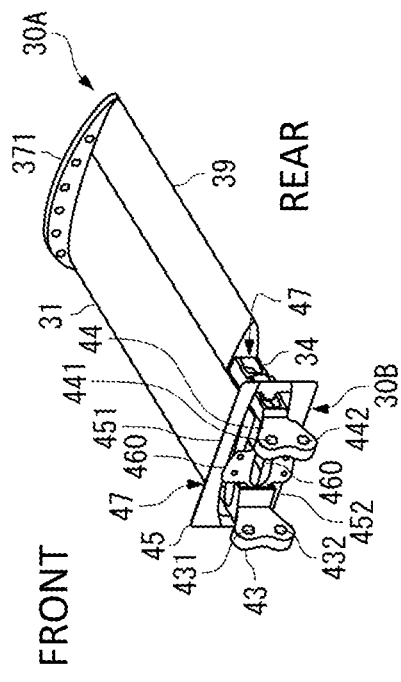
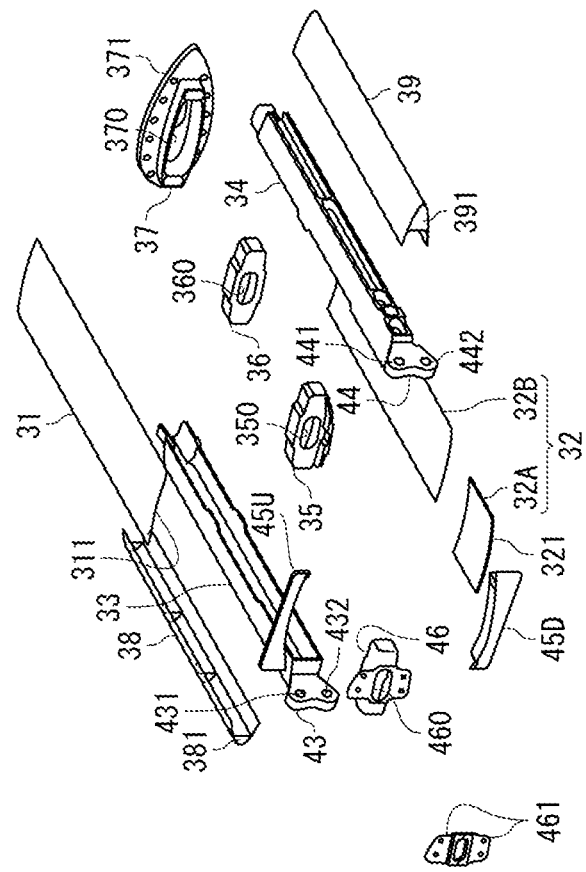
FIG. 3A
FIG. 3B

AIRCRAFT AND METHOD FOR MOUNTING DEVICE TO BE INSTALLED OUTSIDE AIRCRAFT ONTO AIRFRAME

BACKGROUND OF THE INVENTION

Field of the Invention

The present invention relates to a structure and a method for mounting a device which measures physical amounts on the outside of an aircraft or other devices onto an airframe.

Description of the Related Art

In a flight test of an aircraft, a measuring device which measures a water content in the atmosphere is used in order to know the state of ice accretion on the airframe (e.g., National Publication of International Patent Application No. 2007-521463).

The measuring device is fixed on an arm which is provided on the airframe and protrudes to the outside of the aircraft. A large aerodynamic load applied to the measuring device and the arm acts on a part of the airframe which supports the arm.

The airframe of an aircraft is required to achieve necessary strength and rigidity while being lightweight. If the strength and rigidity of structural members (frames, skins, stringers, etc.) of the airframe are increased, the weight of the airframe increases, which affects the flight performance and the fuel efficiency. For this reason, the rigidity of structural members of an airframe is increased only to such a level that they can bear bending applied during flight or a pressure difference between the inside and the outside of the aircraft, and not to such a level that they can bear a large load acting on the airframe due to installation of a measuring device outside the aircraft.

Therefore, to conduct a flight test, it is necessary to modify (alter, reinforce) a part of a manufactured airframe supporting the arm on which a measuring device is fixed. The modification is a large-scale work involving destroying and cutting away a part of the airframe structure and constructing an arm support part in the cutaway part.

When measurement with the measuring device is completed, it is necessary to remove the measuring device and the arm and restore the airframe to its original state. The arm is firmly fixed on the airframe while maintaining the airtightness inside the aircraft, and therefore structurally cannot be removed easily. After the arm is removed, the large-scale work of restoring the modified part, including the airframe structure, to its original state has to be carried out.

Thus, mounting a measuring device or other devices to be installed outside the aircraft onto the airframe requires a huge amount of time and effort as well as a high cost for modification of the airframe and restoration of the modified part.

In view of this, the present invention aims to provide a structure and a method which can reduce the scale of modification of the airframe of an aircraft and allow a device to be installed outside the aircraft to be easily mounted onto the airframe.

SUMMARY OF THE INVENTION

An aircraft of the present invention includes, as a structure for mounting a device to be installed outside the aircraft onto an airframe: a penetration member which penetrates the airframe inwardly and outwardly through an opening included in the airframe, and has a portion to be provided with the device and a portion located inside the aircraft; a seat support member which supports a seat disposed inside the aircraft; and a load transmission member which is connected with the penetration member inside the aircraft and transmits a load input from the penetration member to the seat support member.

In the present invention, the "opening included in the airframe" is not an opening that is provided in the airframe as a result of modification of the airframe performed to mount the device, but is an opening of a window or a door which is already provided in the airframe for various purposes, or an opening provided in a substitute member which can replace a panel member that covers such an opening.

The "opening included in the airframe" communicates between the inside and the outside of the aircraft, and through this opening the penetration member penetrates the airframe inwardly and outwardly.

In the present invention, "front" means the nose side of the aircraft, while "rear" means the tail side of the aircraft. "Upper" means the upper side of the airframe of the aircraft, while "lower" means the lower side of the airframe of the aircraft.

In the present invention, the opening included in the airframe and the seat support member which supports a seat are utilized to mount a device to be installed outside the aircraft onto the airframe.

More specifically, the penetration member is passed through the airframe through the opening included in the airframe, and a load applied to the penetration member and the device is borne by the seat support member.

In an emergency involving a rapid turn or speed change of the airframe, a large load is applied to the seat support member. In order to withstand the large load, the seat support member has very high rigidity compared with structural members of the airframe. Accordingly, it is sufficiently possible to impose the aerodynamic load, which is applied to the penetration member and the device, on the seat support member.

In the present invention, therefore, a path for transmitting a load from the penetration member to the seat support member is formed by interposing the load transmission member between the penetration member and the seat support member. In this way, it is possible to transmit a load input from the outside of the aircraft to the seat support member and reliably impose the load on the seat support member.

According to the present invention, no large-scale modification is required which involves destroying a part of the airframe to provide an opening for the penetration member to pass through and reinforcing the structural members of the airframe so that they can bear a large load around the opening. A device to be installed outside the aircraft can be easily mounted on the airframe, with almost no modification of the airframe, by installing the load transmission member on the seat support member and connecting the penetration member, which is passed through the opening included in the airframe, and the load transmission member with each other.

When the device has served its purpose in a flight test, the airframe can be restored easily to its original state by dismantling the penetration member and the load transmission member from the airframe, and in the case where the above-mentioned substitute member is used, by returning the initially provided panel member into the opening of the window or the door. The present invention incurs no large-scale restoration work due to modification since large-scale modification of the airframe is not performed to mount a device.

Thus, as the scale of modification and restoration required for mounting a device onto the airframe can be drastically reduced, the labor, cost, and working hours can be drastically cut down.

The "device" in the present invention refers to, for example, an instrument which measures and detects physical amounts on the outside of an aircraft, or a camera which photographs a photographing object, such as the surface of the earth, from the outside of an aircraft. This term device includes various devices to be installed outside an aircraft for various purposes.

In the aircraft of the present invention, the opening through which the penetration member is passed can be formed in a window substituting member which is provided in place of an initially provided window panel (original window panel) in a window frame present in the airframe. In this case, the opening of the window substituting member is disposed inside the opening of the window frame, and the penetration member should be passed through the inside of both the opening of the window frame and the opening of the window substituting member.

In the aircraft of the present invention, it is preferable that the penetration member has a wing shape in transverse section.

Then, it is possible to reduce air resistance of the penetration member and suppress disturbance of airflow attributable to the penetration member.

In the aircraft of the present invention, a measuring device which measures physical amounts related to water droplets contained in the atmosphere outside the aircraft can be mounted onto the airframe.

Such a measuring device can be used to know the state of ice accretion on the airframe.

In the aircraft of the present invention, it is preferable that the seat support member includes a first rail member and a second rail member disposed in parallel to each other, and that the load transmission member includes: a framework having two first support pillars rising from the first rail member toward the penetration member and two second support pillars rising from the second rail member toward the penetration member; and plate materials constituting side walls provided in the framework.

Since an in-plane shearing force of the load transmission member can be borne by the plate materials provided in the framework, the load transmission member retains its shape without deforming under a load input from the penetration member.

The load input from the penetration member can be sufficiently transmitted to the seat support member mainly by the first support pillars and the second support pillars. The load is shared between the first rail member, on which the lower ends of the first support pillars are connected, and the second rail member, on which the lower ends of the second support pillars are connected. Thus, the load can be reliably borne by the two rail members.

As will be described later, it is preferable that the aerodynamic load is diverted from the arm to a mount by generating a couple of forces through a moment of a support part of the penetration member caused by the aerodynamic load.

In the aircraft of the present invention, it is preferable that the penetration member has a first connection part; the load transmission member has a second connection part connected with the first connection part; at least one of the first connection part and the second connection part is composed of a pair of members disposed at a distance in the front-rear direction; and the pair of members is connected with a mating part, which is either the first connection part or the second connection part, through a pin extending in the front-rear direction.

Then, when a bending moment is generated due to air resistance in the penetration member from the front side to the rear side, a couple of forces is generated (see forces F1, F2 of FIG. 5B) on the basis of the moment generated in the support part of the penetration member. As the moment is thus counteracted, the aerodynamic load applied to the penetration member can be efficiently diverted to the load transmission member through the first connection part and the second connection part, so that the aerodynamic load can be more reliably transmitted to the seat support member.

In the aircraft of the present invention, it is preferable that the penetration member has a wing shape in transverse section and has a first connection part; the load transmission member has a second connection part connected with the first connection part; and the first connection part and the second connection part are connected with each other through a first pin and a second pin both extending in the front-rear direction and disposed side by side in the upper-lower direction.

Then, when a bending moment is generated in the penetration member due to a lift force, a couple of forces (see forces F1, F2 of FIG. 6B) respectively originating from the first pin and the second pin in the first connection part and the second connection part is generated on the basis of the moment generated in the support part of the penetration member. As the moment is thus counteracted, the load applied to the penetration member can be efficiently diverted to the load transmission member through the first connection part and the second connection part, so that the aerodynamic load can be more reliably transmitted to the seat support member.

In the aircraft of the present invention, it is preferable that the aircraft further includes a seal which seals a clearance defined between the penetration member and a member forming an opening (a structural member of the airframe or a substitute member; hereinafter called an opening forming member), and a retainer which presses the seal against the penetration member and the opening forming member; the penetration member and the opening forming member each have a receiving part for receiving the seal; both receiving parts are disposed in a direction connecting one side and the other side of the clearance across the clearance; and the seal is fixed on only one of the receiving part of the penetration member and the receiving part of the opening forming member.

In the above configuration, the seal is fixed on only one of the penetration member and the opening forming member while being simply supported on the other so as to be able to shift.

Therefore, when the penetration member and the opening forming member relatively shift as the penetration member deforms under an aerodynamic load, the seal shifts in a sliding manner on the side on which it is simply supported. Thus, it is possible to avoid a load directly being input into the opening forming member from the penetration member, as well as to maintain the airtightness between the penetration member and the opening forming member.

A method of the present invention is a method for mounting a device to be installed outside the aircraft, as described above, onto an airframe, including the steps of: removing a window panel provided in a window present in the airframe from a window frame; passing a penetration member, which penetrates the airframe inwardly and outwardly, through the inside of the window frame; installing a load transmission member which transmits a load input from the penetration member to a seat support member, which supports a seat disposed inside the aircraft, on the seat support member; connecting the load transmission member and the penetration member with each other inside the aircraft; providing a window substituting member which forms an opening, through which the penetration member is passed, in the window frame; and providing the device on the penetration member.

In the method of the present invention, it is preferable that the method further includes a step of sealing the clearance between the penetration member and the member forming the opening.

The above steps can be performed in an arbitrary order.

The present invention can be applied not only to an aircraft but also to a railroad vehicle traveling at a high speed. Such railroad vehicles include a superconducting magnetically-levitated linear motor train. In such a railroad vehicle, too, the same problem as with an aircraft described above arises when it is necessary to install a device outside the vehicle for a running test etc.

Therefore, a railroad vehicle of the present invention includes, as a structure for mounting a device to be installed outside the vehicle onto a body structure: a penetration member which penetrates the body structure inwardly and outwardly through an opening included in the body structure, and has a portion to be provided with the device and a portion located inside the vehicle; a seat support member which supports a seat disposed inside the vehicle; and a load transmission member which is connected with the penetration member inside the vehicle and transmits a load input from the penetration member to the seat support member.

According to the present invention, it is possible to drastically reduce the scale of modification of the airframe (or the body structure) and to mount a device to be installed outside the aircraft easily onto the airframe.

BRIEF DESCRIPTION OF THE DRAWINGS

FIG. 3A is an overall perspective view of the arm;

FIG. 3B is an exploded perspective view of the arm;

DETAILED DESCRIPTION OF THE PREFERRED EMBODIMENTS

In the following, an embodiment of the present invention will be described with reference to the accompanying drawings.

Figure 1B:
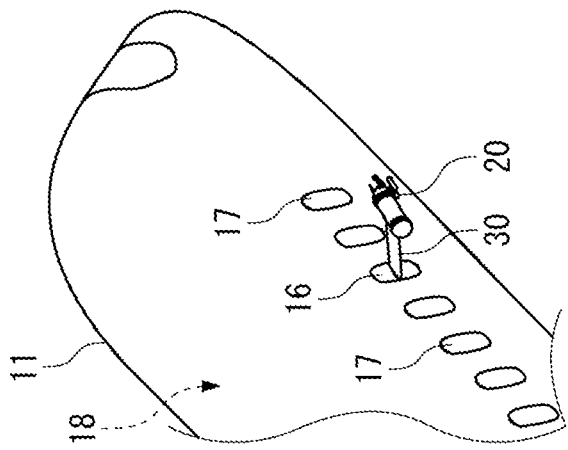
FIG. 1B is a view showing a measuring device mounted through an arm on the airframe of the aircraft according to the embodiment of the present invention (an enlarged view of the area indicated by the one-dot chain line in FIG. 1A)
Figure 1A:
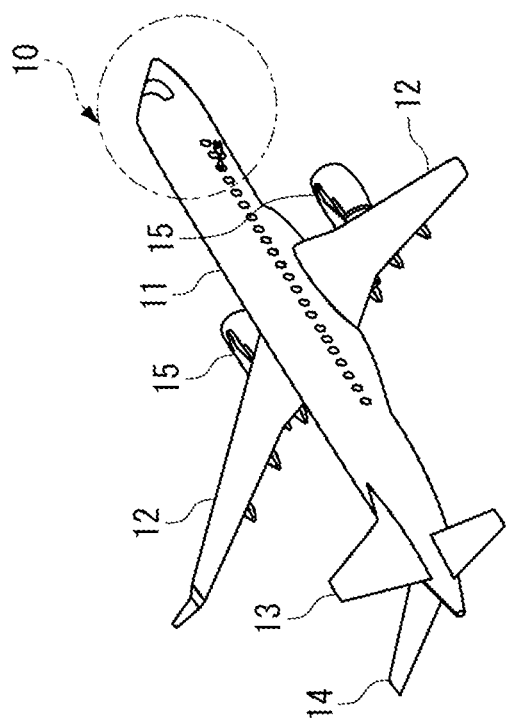
FIG. 1A is an overall view of an aircraft according to an embodiment of the present invention.

As shown in FIG. 1A, an aircraft 10 includes a fuselage 11, main wings 12, 12 provided on the left and right sides of the fuselage 11, a vertical tail 13, and a horizontal tail 14. Engines 15, 15 are supported on the main wings 12, 12, respectively.

For a flight test, a measuring device 20 is mounted on the airframe of the aircraft 10 as shown in FIG. 1B. The measuring device 20 is a device which is installed outside the aircraft in order to know the state of ice accretion on the airframe, and is fixed on an arm 30 extending from a window 16 located on the right side wall of the airframe to the outside of the aircraft.

In order to avoid degradation of aerodynamic performance due to ice accretion on the airframe (especially on the main wing 12), it is necessary to monitor the state of ice accretion and check the performance of a device which melts ice and other devices.

The window 16 is located on the front side in a cabin 18 (passenger cabin).

For installation of the measuring device 20, the window 16 is configured by replacing an existing resin panel, which is formed from an acrylic resin etc., with a window upper part 8A and a window lower part 8B (FIG. 8) which are window substituting members. A resin panel is installed in other windows 17 provided in the cabin 18.

The more specific configuration of the window 16 will be described later.

The measuring device 20 measures the diameter of water droplets contained in the atmosphere and the mass of water per unit volume in the atmosphere. At the front end of the measuring device 20, a measuring part for measuring the diameter of water droplets in the atmosphere by means of a laser beam is provided. Measuring parts for respectively measuring the mass of water per unit volume in the atmosphere and the atmospheric pressure are also provided at the front end of the measuring device 20.

The measured values obtained by the measuring device 20 are sent to a control device inside the aircraft through an electric wire (not shown) provided in the measuring device 20. A device for measuring the amount of ice accretion and a device for measuring the barometric pressure are provided at a plurality of positions of the airframe.

The control device continuously monitors the state of ice accretion, including the presence or absence of ice accretion and the state of ice growth, by appropriately using the diameter of water droplets and the mass of water droplets per unit volume sent from the measuring device 20 and the amount of ice accretion, barometric pressure, etc. sent from other measuring devices. On the basis of the state of ice accretion, the control device checks the performance of the device which melts ice formed on the airframe by heat.

In order to exactly know the state of ice accretion, it is desirable to install the measuring device 20 at a position where a uniform flow of airflows oriented to one direction or an airflow in a state close to a uniform flow is created. Therefore, it is preferable to separate the measuring device 20 by a predetermined distance from the surface of the airframe where a boundary layer is formed, and install the measuring device 20 within an area in which the fuselage 11 continues with a constant diameter. It is also preferable to install the measuring device 20 further on the front side than the main wing 12, where the airflow is stable, while avoiding the rear side of the main wing 12. The front side in the cabin 18 corresponds to a position close to a uniform flow.

In addition, a proper installation position of the measuring device 20 should be selected such that the aerodynamic characteristics of the entire aircraft 10 are not affected by mounting the measuring device 20 on the airframe, and such that the measuring device 20 does not aerodynamically interfere with other devices.

Figure 2:
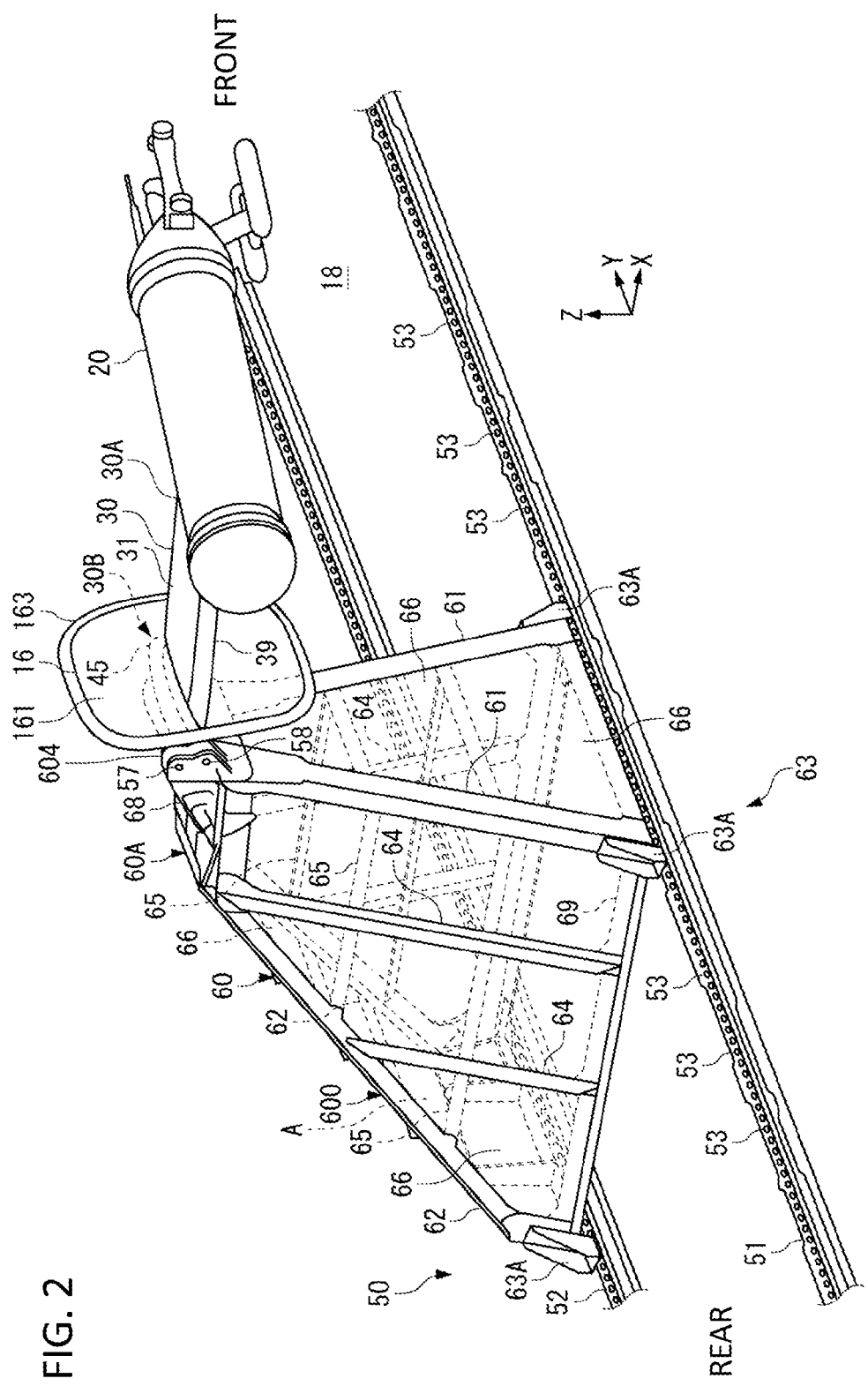
FIG. 2 is a view showing a structure for supporting the measuring device and the arm on the airframe.

The arm 30 penetrates the airframe inwardly and outwardly through the window 16, and as shown in FIG. 2, has a leading end 30A on which the measuring device 20 is fixed and a base end 30B which is connected with a support device 50 provided inside the aircraft. The arm 30 protrudes to the outside of the aircraft substantially perpendicularly to the fuselage 11.

The arm 30 has a box structure similar to that of the main wing 12 so as to achieve a lightweight and highly rigid structure. The arm 30 is formed into a thin wing shape in transverse section in order to reduce air resistance and prevent the arm 30 from disturbing the airflow (buffeting).

As shown in FIGS. 3A and 3B, the arm 30 includes: skins 31, 32 disposed one above the other; a front beam 33 and a rear beam 34 coupling the skins 31, 32 with each other on the front side and the rear side, respectively; a plurality of ribs 35 to 37 supporting the skins 31, 32 from the inside; and a leading edge 38 and a trailing edge 39 located on the front side and the rear side, respectively, of the arm 30. The components of the arm 30 can be formed from a metal material such as an aluminum alloy. The components of the arm 30 can also be formed from a fiber-reinforced resin containing reinforcing fibers such as carbon fibers.

An end rib 37 (FIG. 3B) located at the leading end 30A of the arm 30 has a flange 371 on which the measuring device 20 is fixed. The measuring device 20 is detachably fixed with a fastener on the flange 371.

An electric wire provided in the measuring device 20 is led to the inside of the arm 30 from an opening 370 formed in the end rib 37 and is wired along the lower skin 32. Openings 350, 360, through which the electric wire is passed, are formed in the ribs 35, 36, respectively.

The lower skin 32 is divided into two panels 32A, 32B on the base end 30B side. The larger panel 32B can be removed to lay the electric wire.

At the end of the front beam 33 on the inside of the aircraft, a connection part 43 which is connected with the support device 50 on the inside of the window 16 is provided.

Similarly, at the end of the rear beam 34 on the inside of the aircraft, a connection part 44 which is connected with the support device 50 on the inside of the window 16 is provided.

This pair of connection parts 43, 44 protrudes further toward the inside of the aircraft (FIG. 3A) than ends 311, 321 (FIG. 3B) of the skins 31, 32 on the inside of the aircraft.

Two holes 431, 432 penetrating the connection part 43 in the front-rear direction are formed in the connection part 43. The holes 431, 432 are aligned in the upper-lower-direction.

Two holes 441, 442 similar to the holes 431, 432 are formed in the connection part 44.

The connection parts 43, 44 are connected with a pair of connection parts provided in the support device 50 through pins 57, 58 (FIG. 2) inserted into the above-described two holes formed in each of the connection parts 43, 44. The arm 30 is fixed on the support device 50 by having the connection parts of the arm 30 and the support device 50 connected with each other through the two pins 57, 58.

On the base end 30B side of the arm 30, it is necessary to maintain the pressure inside the aircraft by securing the airtightness between the window 16 and the arm 30. A seal fixing part 45 (FIG. 3A) on which a sealing part 70 to be described later is fixed is provided on the outer periphery of the arm 30 on the base end 30B side.

As shown in FIG. 3B, the seal fixing part 45 is composed of a pair of parts 45U, 45D disposed one on top of the other.

The seal fixing part 45 is formed in a rectangular shape as a whole, and is disposed orthogonally to the axial direction of the arm 30. The front beam 33 and the rear beam 34 penetrate the seal fixing part 45 through the space surrounded by the parts 45U, 45D. The connection part 43 of the front beam 33 and the connection part 44 of the rear beam 34 are located further on the inside of the aircraft than the seal fixing part 45.

An electric wire lead-out part 46, from which the electric wire is led out from the inside of the arm 30, is provided between the connection part 43 and the connection part 44. The space between the connection part 43 and the connection part 44 is covered by another fitting 461 attached to the electric wire lead-out part 46.

The electric wire is led out to the inside of the aircraft through an opening 460 formed in the electric wire lead-out part 46 and is connected with the control device. The clearance between the peripheral edge of the opening 460 and the electric wire is sealed by the fitting 461 and a seal (not shown).

The leading edge 38 and the trailing edge 39 are shorter than the length of the skins 31, 32, and ends 381, 391 (FIG. 3B) of the leading edge 38 and the trailing edge 39 on the inside of the aircraft are offset toward the outside of the aircraft relative to the ends 311, 321 of the skins 31, 32 on the inside of the aircraft (see FIG. 3A). Thus, a housing space 47 (FIG. 3A) for housing a part of the window 16 is formed between the end 381 of the leading edge 38 on the inside of the aircraft and the seal fixing part 45 and between the end 391 of the trailing edge 39 on the inside of the aircraft and the seal fixing part 45.

In case of a lightning strike on the arm 30 and the measuring device 20, the arm 30 is earthed on a frame of the fuselage 11 through a bonding jumper (not shown).

As shown in FIG. 2, the arm 30 protrudes toward the outside of the aircraft from the window 16. The arm 30 and the measuring device 20 generate air resistance during a flight.

Moreover, a lift force acts on the arm 30 during a flight. Having a wing shape in cross-section, the arm 30 is subjected to a large lift force.

It is necessary that the support device 50 is rigid enough to withstand a large aerodynamic load applied to the arm 30 and the measuring device 20 due to the air resistance and the lift force, and reliably supports the arm 30 without deforming even when the aerodynamic load is input into the support device 50.

As shown in FIG. 2, the support device 50 includes two seat rails 51, 52 (also called seat tracks) which support seats (not shown) inside the cabin 18, and a mount 60 provided on the seat rails 51, 52. The seat rails 51, 52 are pieces of standard equipment which are always provided in the aircraft 10 having passenger seats, and an aircraft which is about to undergo a flight test is already provided with seat rails. Being a piece of standard equipment and already provided also applies to the window 16.

The seat rails 51, 52 extend in parallel to each other in the front-rear direction inside the cabin 18, and are installed on the floor of the cabin 18. The seat rails 51, 52 of this embodiment support seats disposed on the right side of a passage extending inside the cabin 18 in the front-rear direction. Those seats disposed on the left side of the passage are supported by other seat rails provided in parallel to the seat rails 51, 52.

The seats are fixed on the seat rails 51, 52 with fixtures (not shown). Many engaging parts 53 (holes) which can engage the fixtures are formed in each of the seat rails 51, 52 at regular intervals in the length direction. The seat position can be adjusted through appropriate selection of the engaging parts 53.

The seat rails 51, 52 support the seats and passengers sitting on the seats, and are subjected to a large load in an emergency involving a rapid turn or speed change of the airframe. Since these seat rails 51, 52 have the rigidity required to bear a large load in an emergency, it is sufficiently possible to impose the aerodynamic load applied to the arm 30 and the measuring device 20 on the seat rails 51, 52. Therefore, the seat rails 51, 52 are utilized as members for bearing the aerodynamic load of the measuring device 20 and the arm 30.

It is preferable that the seat rails 51, 52 are formed of a metal material having a high specific strength such as an aluminum alloy or a titanium alloy.

The mount 60 is interposed between the seat rails 51, 52 installed on the floor of the cabin 18 and the arm 30 penetrating the window 16 installed in the wall of the cabin 18.

The mount 60 transmits an aerodynamic load input from the arm 30 to the seat rails 51, 52. The entire aerodynamic load is imposed on the seat rails 51, 52 having sufficient rigidity.

Tension members 63 of the mount 60 are fixed at two positions on the front and rear sides of the seat rail 51 located under the window 16 and at the two positions on the front and rear sides of the seat rail 52 corresponding to the two positions on the seat rail 51. The tension members 63 are detachable from the seat rails 51, 52.

Figure 4:
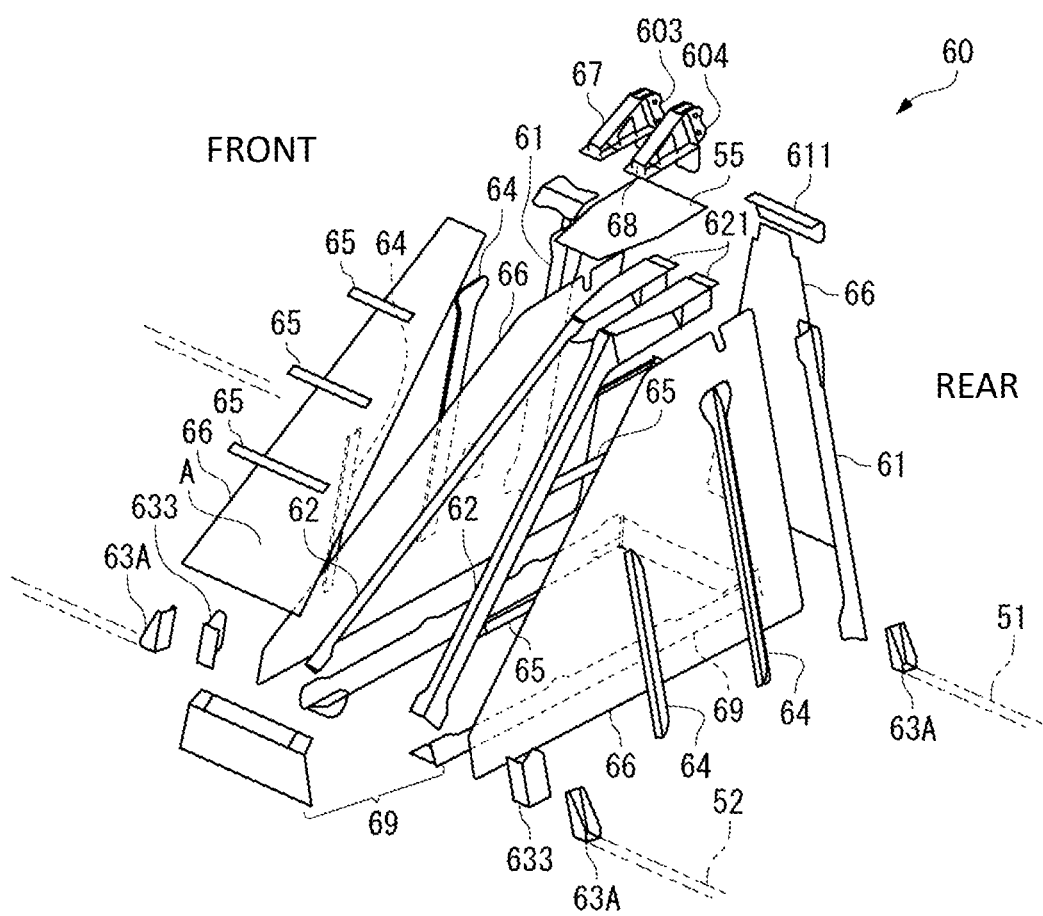
FIG. 4 is an exploded perspective view of a mount which is interposed between the arm and a seat rail.

As shown in FIG. 2 and FIG. 4, the mount 60 is a framework 600 having the shape of a vaulting box installed on the seat rails 51, 52 and provided with four thin side plates 66. An upper end 60A of the mount 60 is located at a position shifted to the window 16 side from the center between the seat rails 51, 52. It is preferable that the mount 60 is formed of an aluminum alloy for weight reduction.

Two first support pillars 61, 61 of the framework 600 rise toward the front of the window 16 from the one seat rail 51 under the window 16. Similarly, two second support pillars 62, 62 of the framework 600 rise at an angle toward the front of the window 16 from the other seat rail 52. The aerodynamic load input from the arm 30 is transmitted to the seat rails 51, 52 mainly through these first support pillars 61, 61 and second support pillars 62, 62 and a top plate 55 located at the upper end 60A.

The first support pillars 61, 61 and the second support pillars 62, 62 have an L-shape in cross-section. Mainly a tensile load and a compressive load in the upper-lower direction are applied to the seat rails 51, 52 through these first support pillars 61, 61 and second support pillars 62, 62.

The four side plates 66 form the side walls on the four sides of the mount 60, and couple adjacent ones of the support pillars 61, 61, 62, 62. The top plate 55 forms the upper wall of the mount 60, and couples the support pillars 61, 61, 62, 62. These side plates 66 and top plate 55 bear an in-plane shearing force of the wall of the mount 60, and reinforce the framework 600. The mount 60 retains its shape without deforming under the load input from the arm 30.

The more detailed configuration of the mount 60 will be described below.

The mount 60 includes the first support pillars 61, 61, the second support pillars 62, 62, the tension members 63 fixing these support pillars 61, 61, 62, 62 on the seat rails 51, 52, longitudinal reinforcing members 64 rising from a frame body 69 between the first support pillar 61 and the second support pillar 62, a plurality of lateral reinforcing members 65 provided horizontally between adjacent ones of the support pillars 61, 61, 62, 62, the side plates 66 and the top plate 55 which are total five sheets of face materials, and a pair of connection members 67, 68 connected with the connection parts 43, 44 of the base end 30B of the arm 30.

The lateral reinforcing members 65 are disposed on the inside and the outside of the side plates 66, while the longitudinal reinforcing members 64 are disposed on the outside of the side plates 66. The lateral reinforcing members 65 provided on the side plate 66 indicated by A in FIG. 2 are provided on the outside of this side plate 66, and the rest of the lateral reinforcing members 65 is provided on the inside of the side plates 66.

The frame body 69 supporting the side plates 66 from the inside is provided at the lower end of the mount 60. The frame body 69 is assembled from a plurality of parts into a rectangular shape.

The components of the mount 60 are assembled with one another through fasteners etc.

The tension member 63 is composed of a part 63A fixed at the lower end of each of the first support pillars 61, 61 and the second support pillars 62, 62. The tension members 63 are detachably fixed on appropriate ones of the engaging parts 53 on the seat rails 51, 52.

The tension members 63 resist the tensile load and the compressive load transmitted through the support pillars 61, 61, 62, 62 from the arm 30 while sharing the loads among the parts 63A, and securely fix the support pillars 61, 61, 62, 62 on the seat rails 51, 52. Thus, it is guaranteed that the aerodynamic load is sufficiently transmitted to the seat rails 51, 52 through the support pillars 61, 61, 62, 62.

Parts 63A, 63A corresponding to the first support pillars 61, 61 are disposed so as to hold the mount 60 therebetween from the outside in the length direction of the seat rail 51, and are fixed at the lower end of the first support pillar 61 and at the same time fixed on the engaging part 53 of the seat rail 51.

Parts 63A, 63A corresponding to the second support pillars 62, 62 are disposed so as to hold the mount 60 therebetween from the outside in the length direction of the seat rail 52, and are fixed at the lower end of the second support pillar 62 and at the same time fixed on the engaging part 53 of the seat rail 52. These parts 63A, 63A are fixed on the second support pillar 62 through a reinforcing material 633 disposed at the corner of the side plates 66.

The top plate 55 is provided horizontally at the upper end 60A of the mount 60 in which the upper ends of the first support pillars 61, 61 and the second support pillars 62, 62 are gathered. The top plate 55 is supported by a support part 621 formed horizontally at the upper end of each of the second support pillars 62, 62. The end parts of the support parts 621, 621 are fixed on a lateral support pillar 611 provided at the upper ends of the first support pillars 61, 61. The connection members 67, 68 are fixed on the upper surfaces of the lateral support pillar 611, the support part 621, and the top plate 55.

The connection member 68 has a connection receiving part 604 protruding toward the window 16 from the top plate 55. The connection receiving part 604 and the connection part 44 (FIG. 3A) are connected with each other through the pins 57, 58 (FIG. 2) inserted into two holes aligned in the upper-lower direction in the connection receiving part 604. The pins 57, 58 are both disposed along the front-rear direction and are provided so as to be detachable from the connection receiving part 604 and the connection part 44.

The connection member 67 has a connection receiving part 603 similar to the connection receiving part 604. The connection receiving part 603 and the connection part 43 (FIG. 3A) are connected with each other through the pins 57, 58 (FIG. 5) inserted into two holes aligned in the upper-lower direction in the connection receiving part 603.

The aerodynamic load applied to the arm 30 and the measuring device 20 is input into the mount 60 through the connection parts 43, 44 and the connection receiving parts 603, 604.

As will be shown below, the connection parts 43, 44 and the connection receiving parts 603, 604, while having a simple structure, can receive both moments M1, M2 generated in the support part of the arm 30.

Figure 5A:
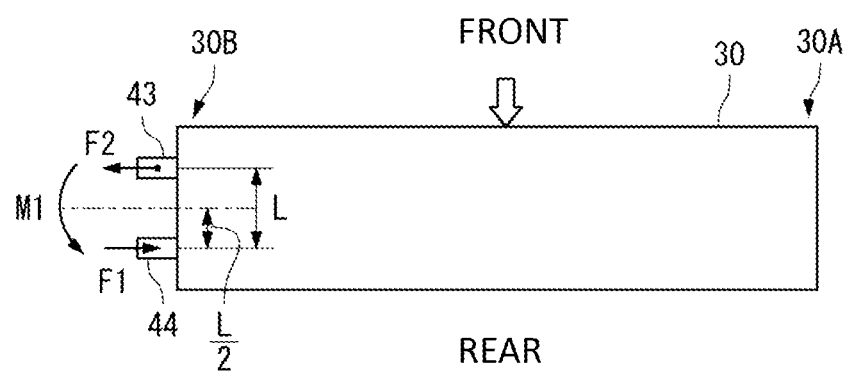
FIG. 5A is a schematic view illustrating counteracting of a moment in a connection part between the arm and the mount.

As shown in FIG. 5A, when a drag (outlined arrow) acts on the arm 30 from the front side to the rear side due to air resistance and a bending moment is generated in the arm 30, the moment M1 balancing the bending moment of the arm 30 is generated in the connection part which cantilevers the base end 30B of the arm 30 on the airframe side.

Figure 5B:
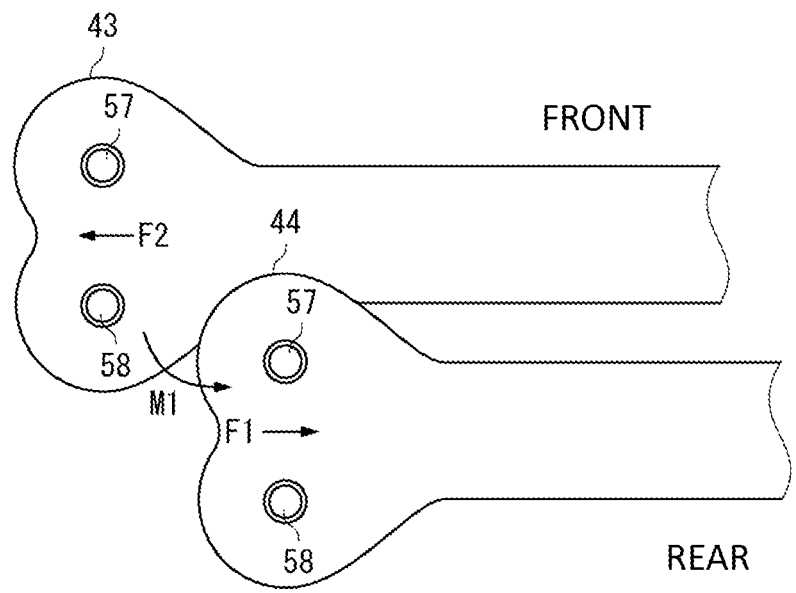
FIG. 5B is a schematic view illustrating counteracting of a moment in the connection part between the arm and the mount.

In this embodiment, as shown in FIGS. 5A and 5B, a couple of forces F1, F2 is generated through this moment M1 in the connection part 43 and the connection part 44 of the arm 30. More specifically, the force F1 pushing toward the inside of the aircraft is generated in the connection part 43 located on the front side of the arm 30, while the force F2 pulling toward the outside of the aircraft is generated in the connection part 44 located on the rear side. A similar force F1 is generated in the connection receiving part 603 (FIG. 2) of the mount 60 connected with the connection part 43 through the pins 57, 58, and a similar force F2 is generated in the connection receiving part 604 (FIG. 4) of the mount 60 connected with the connection part 44 through the pins.

As shown in FIG. 5A, when the distance between the connection part 43 and the connection part 44 is L, the moment related to each of the couple of forces F1, F2 generated on both sides of the center line dividing the distance L into two equal parts and the moment M1 balance with each other as shown by the following expression (1):

$$-M1-(L/2)F1-(L/2)F2=0 \qquad (1)$$

That is, since the moment M1 is counteracted by the pushing and pulling of the couple of forces F1, F2, the mount 60 can sufficiently receive a load in the axial direction of the arm 30 and a load in the direction perpendicular to the axial direction of the arm 30 through the connection parts 43, 44 and the connection receiving parts 603, 604.

Figure 6A:
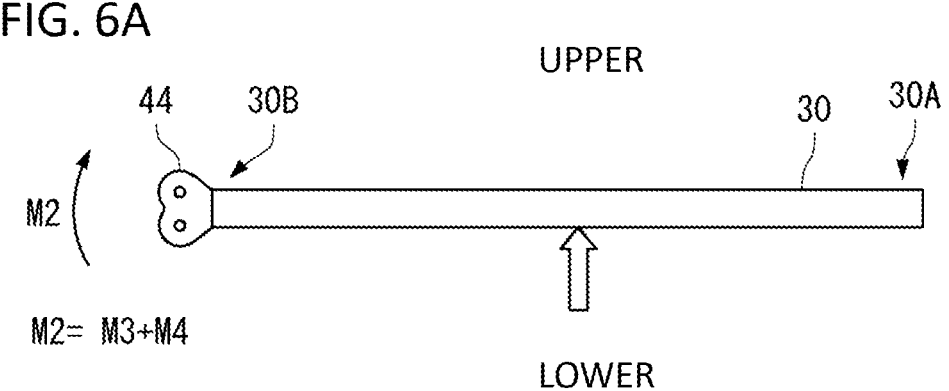
FIG. 6A is a schematic view illustrating counteracting of a moment in the connection part between the arm and the mount.
Figure 6B:
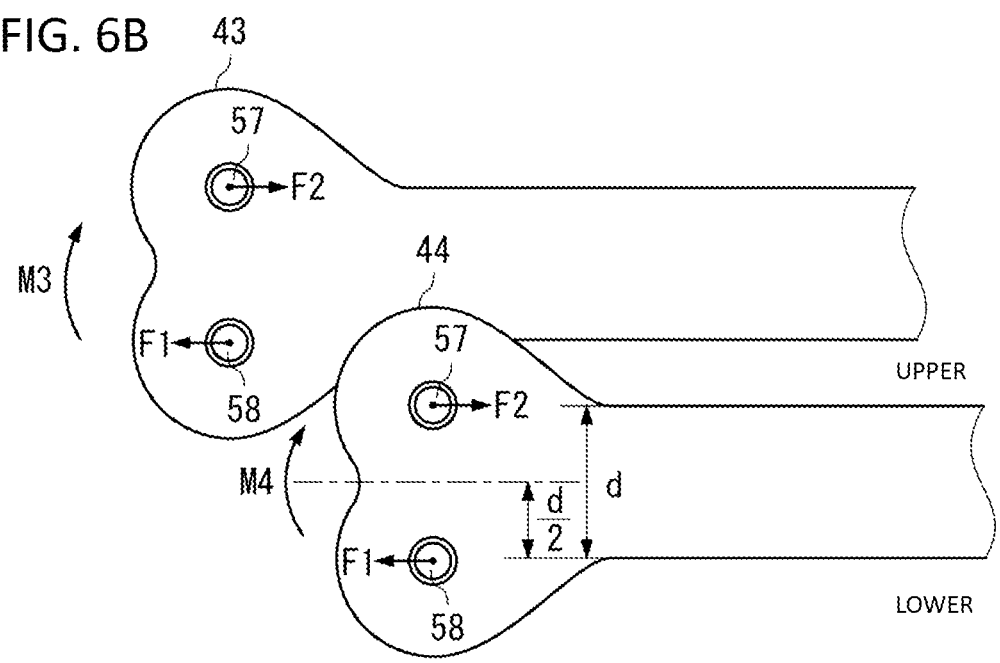
FIG. 6B is a schematic view illustrating counteracting of a moment in the connection part between the arm and the mount.

Moreover, as shown in FIG. 6A, when a bending moment is generated in the arm 30 due to a lift force (outlined arrow) acting from the lower side toward the upper side, a moment M2 balancing this bending moment is generated in the connection part which cantilevers the base end 30B of the arm 30 on the airframe side. As shown in FIG. 6B, the moment M2 is the sum of a moment M3 generated in the connection part 43 and a moment M4 generated in the connection part 44 (M2=M3+M4).

In this embodiment, the couple of forces F1, F2 originating from the two pins 57, 58 are generated through the moment M3 in the connection part 43 of the arm 30, and at the same time, the couple of forces F1, F2 originating from the two pins 57, 58 are generated through the moment M4 in the connection part 44 of the arm 30. More specifically, the force F1 originating from the pin 58 and pushing toward the inside of the aircraft is generated in the connection part 43, and the force F2 originating from the pin 57 and pulling toward the outside of the aircraft is generated in the connection part 43. Similar forces F1, F2 are generated in the connection receiving part 603.

In the connection part 44, too, the force F1 originating from the pin 58 and pushing toward the inside of the aircraft is generated and the force F2 originating from the pin 57 and pulling toward the outside of the aircraft is generated, and similar forces F1, F2 are generated in the connection receiving part 604.

As shown in FIG. 6B, when the distance between the pin 57 and the pin 58 provided in the connection part 44 is d, the moment related to each of the couple of forces F1, F2 generated on both sides of the center line dividing the distance d into two equal parts and the moment M4 balance with each other as shown by the following expression (2):

$$M4+(d/2)F1+(d/2)F2=0 \qquad (2)$$

Similarly, for the connection part 43, the moment related to each of the couple of forces F1, F2 and the moment M3 balance with each other as shown by the following expression (3):

$$M3+(d/2)F1+(d/2)F2=0 \qquad (3)$$

As has been described, as the moment M2 (M3+M4) and the moment related to the couple of forces F1, F2 balance with each other, the mount 60 can sufficiently receive a load in the axial direction of the arm 30 and a load in the direction perpendicular to the axial direction of the arm 30, from the arm 30 through the connection parts 43, 44 and the connection receiving parts 603, 604.

The above-described couple of forces F1 and F2 and the moment M2 balance with each other.

In addition, since the connection parts 43, 44 and the connection receiving parts 603, 604 are connected through the pins, it is possible to transmit only an axial load between the connection parts 43, 44 and the connection receiving parts 603, 604.

Thus, the mount 60 can sufficiently receive a load in the axial direction of the arm 30 and a load in the direction perpendicular to the axial direction of the arm 30, from the arm 30 through the connection parts 43, 44 and the connection receiving parts 603, 604.

Next, the configuration of the window 16 will be described, and then a sealing part 70 which secures the airtightness of the part at which the arm 30 penetrates the window 16 will be described.

Figure 7:
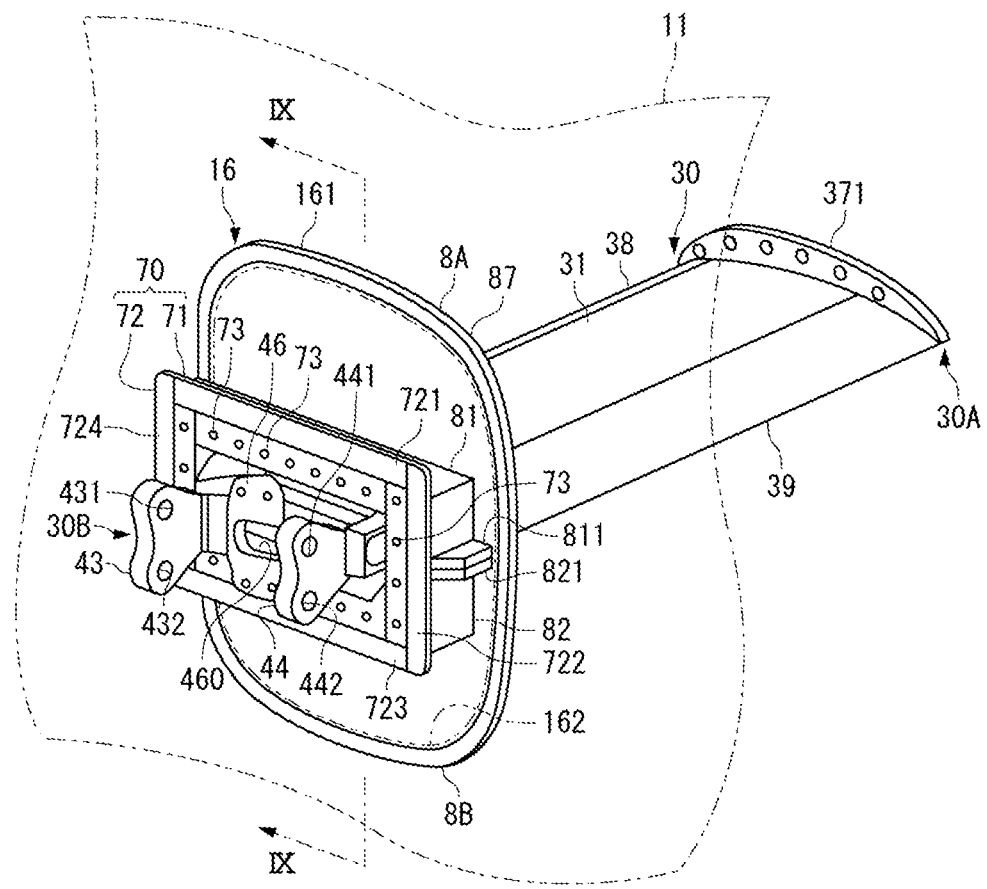
FIG. 7 is a view showing the arm, a window, and a sealing part.
Figure 9:
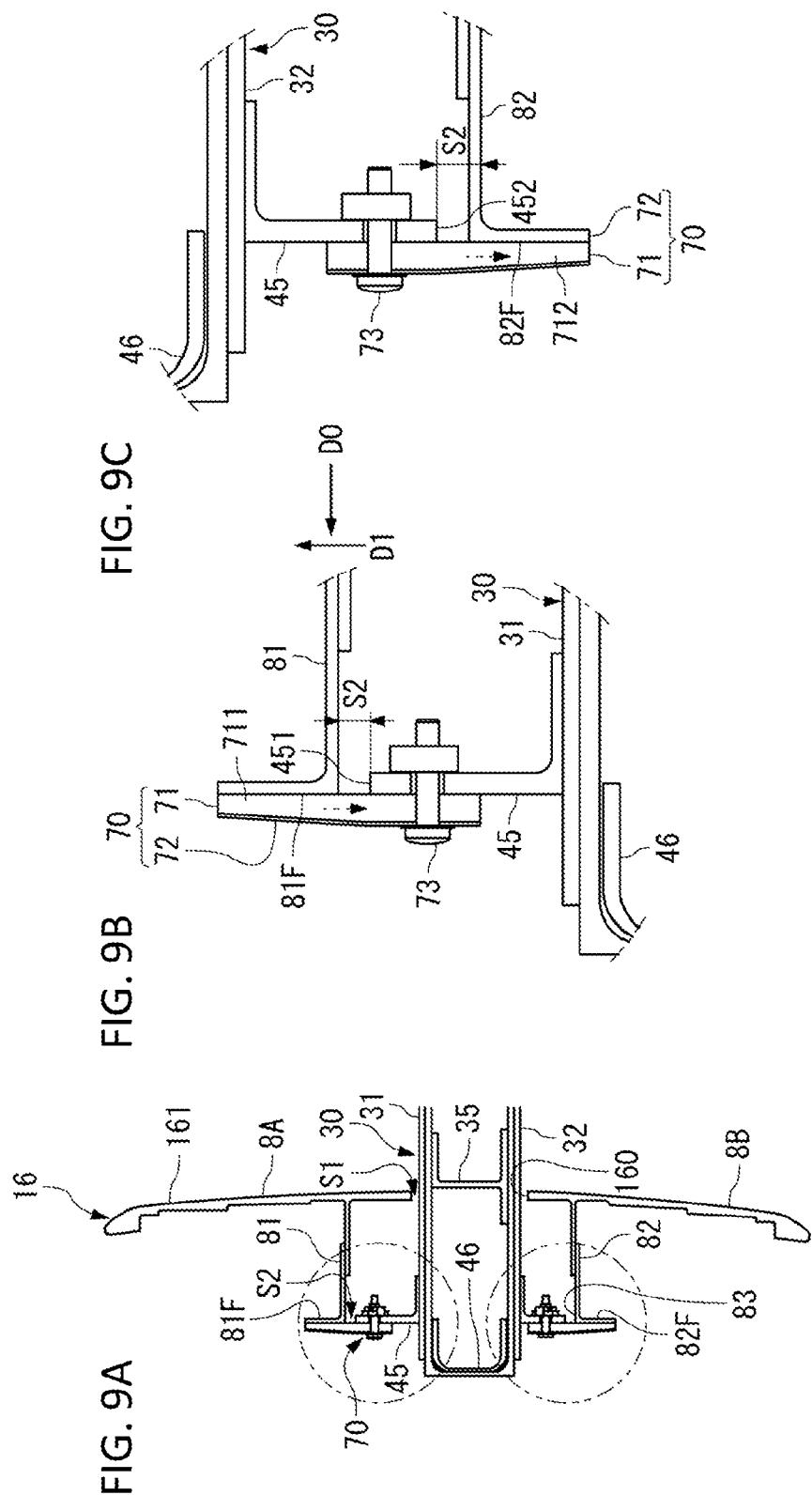
FIG. 9A is a view along the line IX-IX of FIG. 7.
FIG. 9B is a view showing an upper part of the sealing part (an enlarged view of the area indicated by the one-dot chain line in FIG. 9A)
FIG. 9C is a view showing a lower part of the sealing part (an enlarged view of the area indicated by the two-dot chain line in FIG. 9A)

As shown in FIG. 7 and FIG. 9, the window 16 includes a metal panel 161, a reinforcing material (not shown) provided on the surface of the metal panel 161 on the inside of the aircraft, and an upper support 81 and a lower support 82 protruding in the out-of-plane direction of the metal panel 161.

The metal panel 161 is fixed from the inside of the aircraft on a window frame 162 (FIG. 7) formed in the fuselage 11 using a plurality of clips (not shown). The clearance between the outer periphery of the metal panel 161 and the inner periphery of the window frame 162 is sealed by a rubber gasket 163 (FIG. 2). These clips and gasket 163 are the same as those provided in the window 17.

Figure 8:
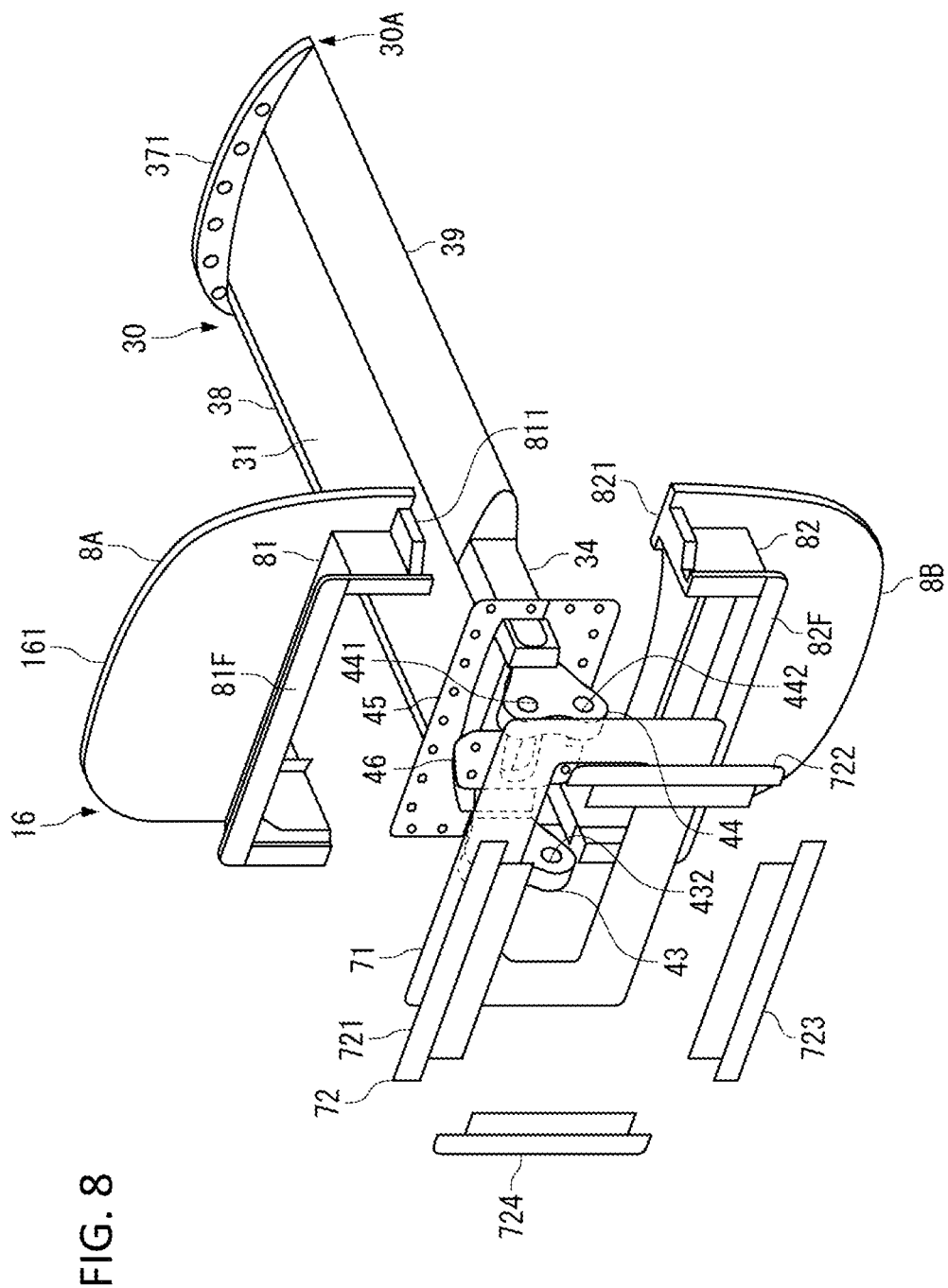
FIG. 8 is an exploded view of the window and the sealing part.

As shown in FIG. 8, the window 16 of this embodiment is halved into upper and lower parts, and includes the window upper part 8A and the window lower part 8B. The arm 30 and the window 16 can be assembled with each other by holding the arm 30 with these window upper part 8A and window lower part 8B from the upper and lower sides.

An upper support 81 is provided on the window upper part 8A on the inside of the aircraft. A lower support 82 is provided on the window lower part 8B on the inside of the aircraft. These upper support 81 and lower support 82 form a box-shaped structure surrounding the outer periphery of the arm 30. The upper support 81 and the lower support 82 are housed inside the housing space 47 of the arm 30.

The upper support 81 and the lower support 82 are fixed by a fixing part 811 and a fixing part 821 formed on the left and right sides in the front view of the window 16.

As shown in FIG. 9A, a panel opening 160 is formed in the metal panel 161, and a support opening 83 is formed on the inside of the upper support 81 and the lower support 82. The arm 30 penetrates the window 16 through these panel opening 160 and support opening 83.

The panel opening 160 is slightly larger than the outer shape of the arm 30 in the housing space 47 (FIG. 3A). In this panel opening 160, a clearance S1 of a predetermined dimension is defined along the entire circumference between the arm 30 and the metal panel 161.

The support opening 83 is slightly larger than the outer shape of the seal fixing part 45 of the arm 30.

As shown in FIG. 8, flanges 81F, 82F expanding toward the outside of the support opening 83 are formed in the upper support 81 and the lower support 82, respectively, on the inside of the aircraft. In the support opening 83, a clearance S2 (FIG. 9A) of a predetermined dimension is defined along the entire circumference between the inner periphery of the flanges 81F, 82F and the outer periphery of the seal fixing part 45. These flanges 81F, 82F are disposed flush with the surface of the seal fixing part 45 on the inside of the aircraft across the clearance S2 (FIG. 9B). The flanges 81F, 82F along with the seal fixing part 45 function as a seal reception surface for receiving the seal 71 along the direction orthogonal to the axial direction of the arm 30. By providing the upper support 81 and the lower support 82 in a box shape as described above, the seal receiving surface for receiving the seal 71 along the direction orthogonal to the axial direction of the arm 30 can be easily provided in the member of the window 16 as the flanges 81F, 82F of the upper support 81 and the lower support 82. As will be described later, it is possible to prevent a load from being input from the arm 30 into the window 16 by sliding the seal 71 along these flanges 81F, 82F.

As shown in FIG. 9A, the flanges 81F, 82F and the seal fixing part 45 of this embodiment are all disposed along a distance D1 connecting one side and the other side of the clearance S2 across the clearance S2. The clearance S2 is formed by opposing the seal fixing part 45 and the flanges 81F, 82F to each other, and the direction connecting the seal fixing part 45, which is one of the members forming the clearance S2, and the flanges 81F, 82F, which are the other of the members forming the clearance S2, corresponds to the direction D1 connecting one side and the other side of the clearance S2. In this embodiment, the direction D1 connecting one side and the other side of the clearance S2 corresponds to the direction orthogonal or substantially orthogonal to an axial direction DO of the arm 30. Thus, the seal fixing part 45 and the flanges 81F, 82F are disposed along the direction orthogonal or substantially orthogonal to the axial direction DO of the arm 30.

Next, the sealing part 70 will be described.

As shown in FIGS. 8, 9A, 9B and 9C, the sealing part 70 includes the seal 71 sealing the clearance S2 and the retainer 72 pressing the seal 71. The seal 71 and the retainer 72 extend along the seal fixing part 45 and the flanges 81F, 82F disposed across the clearance S2.

The seal 71 has a frame shape, and seals the clearance S2 between the flanges 81F, 82F (window 16) and the seal fixing part 45 (arm 30).

An appropriate rubber material can be used for the seal 71. The seal 71 in this embodiment is formed of flame-retardant chloroprene rubber.

The retainer 72 is composed of a plurality of parts 721 to 724. The parts 721 to 724 are all flat springs and assembled into a frame shape. The retainer 72 is similar in dimension to the seal 71, and presses the entire circumference of the seal 71 toward the flanges 81F, 82F and the seal fixing part 45. The retainer 72 can be formed from a metal material such as an aluminum alloy or stainless steel. The retainer 72 has a higher elastic modulus than the material used for the seal 71. The elastic modulus here refers to Young's modulus (longitudinal elastic modulus).

The seal 71 and the retainer 72 are fastened on the seal fixing part 45 through a fastener 73 (FIGS. 7, 9A, 9B and 9C) penetrating the seal 71 and the retainer 72 in the thickness direction. The plurality of fasteners 73 are disposed at regular intervals along the entire circumference of the seal fixing part 45. The seal 71 and the retainer 72 are not fixed through fasteners on the flanges 81F, 82F.

When the fasteners 73 are fastened, the seal 71 is compressed between the retainer 72 and the seal fixing part 45 and the clearance S2 is sealed.

As shown in FIG. 9B, the part of the retainer 72 overlapping the flanges 81F, 82F is slightly inclined toward the outside of the aircraft relative to the part of the retainer 72 overlapping the seal fixing part 45, and reliably presses the seal 71 against the flanges 81F, 82F.

A pressure difference between the pressure inside the aircraft and the atmospheric pressure outside the aircraft acts on the seal 71 sealing the clearance S2. In order to maintain the pressure inside the aircraft, the clearance S2 needs to be completely sealed by the seal 71 without leaving a clearance.

However, especially immediately after the start of a flight etc. when the barometric pressure outside the aircraft rapidly falls due to an increase in flight altitude, the seal 71 is displaced and a clearance is likely to be created between the seal 71 and the seal fixing part 45 and the flanges 81F, 82F. To prevent this and maintain the pressure inside the aircraft, the seal 71 is pressed by the retainer 72 against the seal fixing part 45 and the flanges 81F, 82F.

Here, if the seal 71 and the retainer 72 are fixed on both the seal fixing part 45 and the flanges 81F, 82F, a load is input from the arm 30 into the window 16 when the arm 30 deforms under an aerodynamic load. As a result, the seal 71 is displaced from the clearance S2 or deforms excessively and lifts from the seal fixing part 45 or the flanges 81F, 82F, or the window upper part 8A and the window lower part 8B or the window frame 162 is damaged, leading to loss of airtightness. In order to prevent this, the seal 71 is fixed only on the seal fixing part 45. That is, the seal 71 is fixed on one end side on the seal fixing part 45 while being simply supported by the flanges 81F, 82F on the other end side.

To sum up, it is necessary to secure the airtightness by the seal 71 during a fall of barometric pressure outside the aircraft, as well as to secure the airtightness between the arm 30 and the window 16 when the arm 30 is deformed under an aerodynamic load, without transmitting the load from the arm 30 to the window 16. For this purpose, the above-described clearances S1, S2 are defined between the window 16 and the arm 30, and the seal 71 sealing the clearance S2 is pressed by the retainer 72 against the window 16 and the arm 30 while the seal 71 is fixed on one side.

As described above, since the seal 71 is pressed by the retainer 72 and the seal 71 is fixed on one side on the seal fixing part 45 of the arm 30, the seal 71 slides against the friction of the window 16 with the flanges 81F, 82F according to the shift of the seal fixing part 45 of the arm 30 deformed under an aerodynamic load.

For example, FIGS. 9B and 9C show the upper end and the lower end of the seal 71, and show how the seal 71 slides toward the lower side along the flanges 81F, 82F so as to follow the shift of the seal fixing part 45 (see the dashed arrow).

Thus, it is possible to avoid a load being directly input into the window 16 from the arm 30 by shifting the seal 71 in a sliding manner along the flanges 81F, 82F.

It is also possible to configure such that the seal 71 is fixed on the flanges 81F, 82F while being simply supported by the seal fixing part 45. In this case, too, as the seal 71 shifts in a sliding manner along the seal fixing part 45, a direct load input from the arm 30 into the window 16 can be avoided.

According to the above description, in the structure in which the seal 71 maintaining the airtightness between the arm 30 and the window 16 is pressed by the retainer 72, a mechanism for avoiding load transmission between the arm 30 and the window 16 can be realized by configuring such that the seal 71 is fixed only on one of the arm 30 and the window 16 while being slidably supported by the other. According to this mechanism, it is possible to more reliably maintain the airtightness of a part by the seal 71 where maintaining the airtightness is difficult due to a relative shift of a sealing object (arm 30 and window 16) caused by deformation of the arm 30 under an aerodynamic load.

Figure 10:
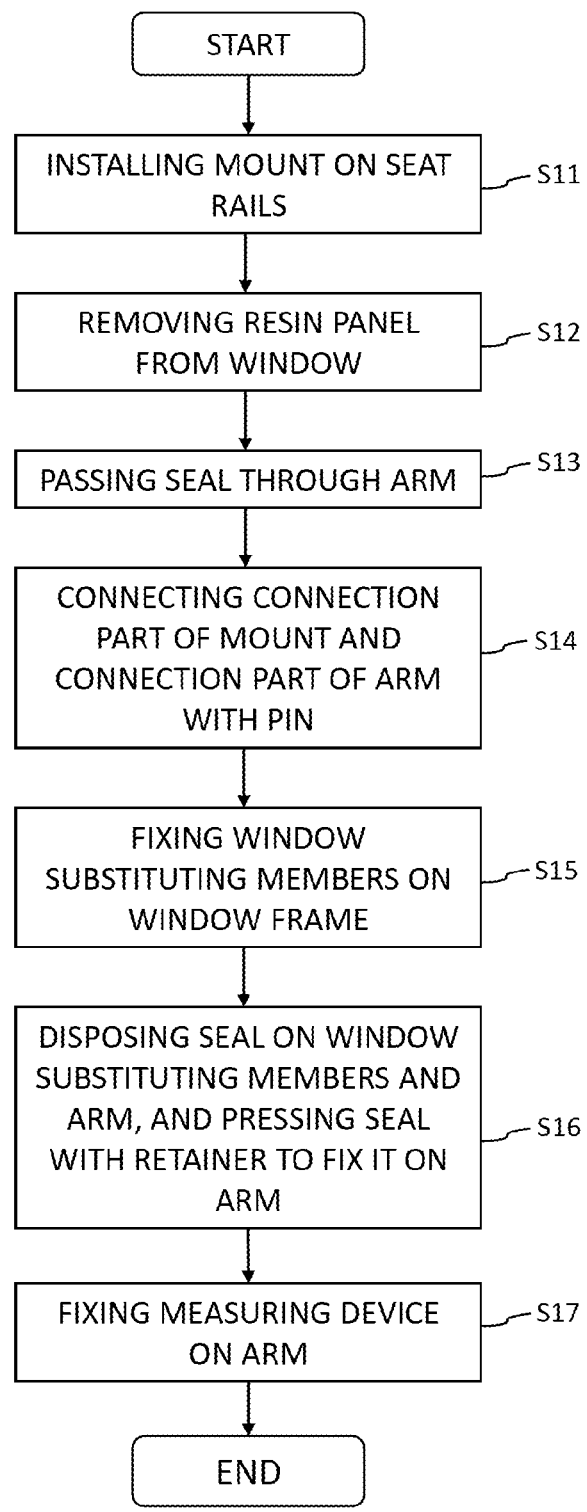
FIG. 10 is a chart showing a work procedure for mounting the measuring device onto the airframe.

Next, one example of a work procedure performed to mount the measuring device 20 onto the airframe of the aircraft 10 will be described with reference to FIG. 10.

The measuring device 20 is mounted onto the airframe using the seat rails 51, 52 and the window 16.

First, from the plurality of windows 17 of the cabin 18, the window 16 is selected on the basis of airflow conditions etc., and the mount 60 is installed at a position on the seat rails 51, 52 corresponding to the window 16 (step S11). More specifically, the mount 60 is fixed on the seat rails 51, 52 using the tension members 63 (composed of the parts 63A) which are fixed on the engaging parts 53 on the seat rails 51, 52.

Next, an existing resin panel of the window 16 is removed from the window frame 162 (step S12). Subsequently, the seal 71 is passed through the connection parts 43, 44 of the arm 30 (S13), and then the arm 30 is passed through the opening of the window 16 from the outside of the aircraft, and the connection part 43 of the arm 30 and the connection receiving part 603 of the mount 60 are connected with each other through the pins (step S14). More specifically, the connection part 43 of the arm 30 and the connection receiving part 603 of the mount 60 are connected with each other through the two pins 57, 58, and the connection part 44 of the arm 30 and the connection receiving part 604 of the mount 60 are connected with each other through the two pins 57, 58.

Next, the arm 30 is held between the window upper part 8A and the window lower part 8B from the upper and lower sides, and the window upper part 8A and the window lower part 8B are fixed inside the housing space 47 of the arm 30. Each of the window upper part 8A and the window lower part 8B is fixed on the window frame 162 with the clips (step S15). The gasket 163 and the clips used for the resin panel removed in step S12 can be used for the metal panel 161.

Further, the seal 71, which has been passed through the connection parts 43, 44 of the arm 30 in step S13, is disposed on the seal fixing part 45 of the arm 30 and the flanges 81F, 82F of the window 16, and the seal 71 is pressed by the retainer 72, and then the seal 71 and the retainer 72 are fastened on the seal fixing part 45 (step S16).

Then, the measuring device 20 is fixed on the flange 371 at the leading end 30A of the arm 30 (step S17).

The work of mounting the measuring device 20 onto the airframe is completed by wiring the electric wire and mounting the bonding jumper at an appropriate timing in addition to performing the above-described work.

A flight test of the aircraft 10 is performed with the measuring device 20 mounted on the airframe.

The above-described steps S11 to S17 can be performed in an appropriate order taking in consideration of the work efficiency etc.

When the flight test for knowing the state of ice accretion is finished, it is necessary to eventually dismantle the measuring device 20 and, of the members used for mounting the measuring device 20, those members that are not standard equipment of the airframe and have been provided only for mounting the measuring device 20, from the airframe. The members to be dismantled are the measuring device 20, the arm 30, the mount 60, the window upper part 8A, the window lower part 8B, and the sealing part 70 (seal 71, retainer 72).

Figure 11:
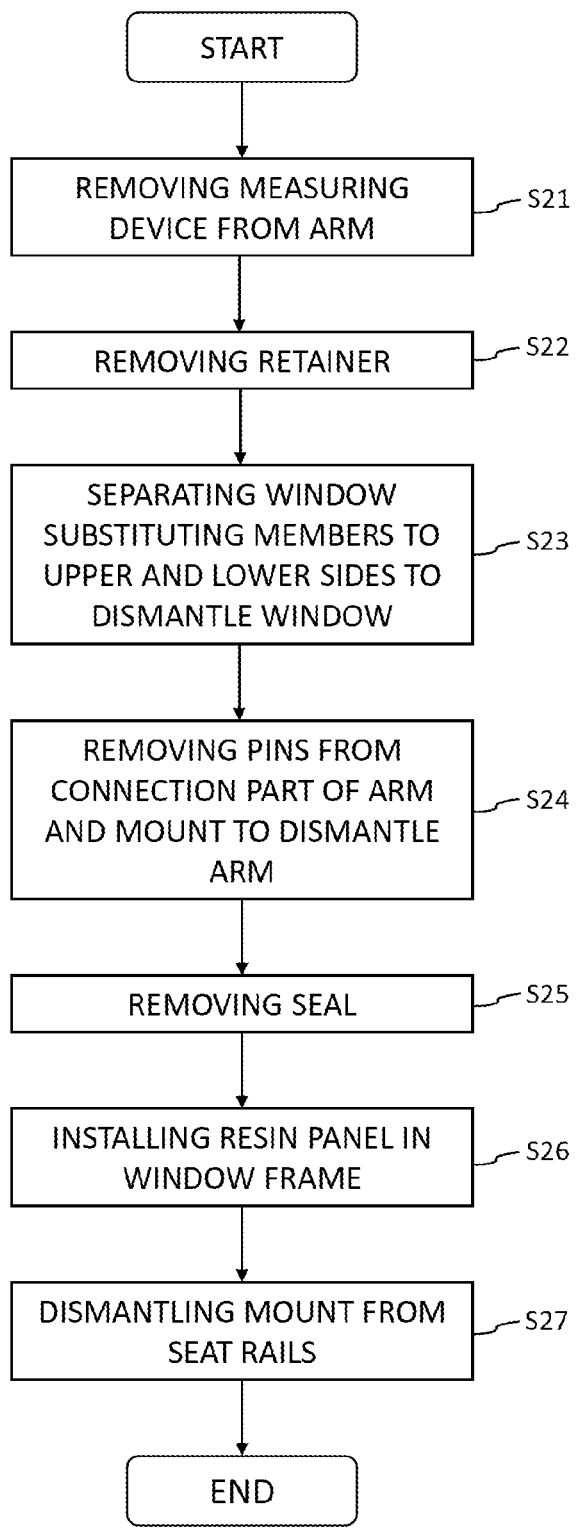
FIG. 11 is a chart showing a work procedure for dismantling the members provided to mount the measuring device on the airframe.

One example of a procedure of work required for dismantling will be described with reference to FIG. 11.

First, the measuring device 20 is removed from the arm 30 (step S21).

Next, the fastener 73 is removed from the sealing part 70 and the seal fixing part 45 to remove the retainer 72 (step S22).

Next, the clips fixing the window upper part 8A and the window lower part 8B on the window frame 162 are removed, and the fasteners fixing the window upper part 8A and the window lower part 8B are also removed. Then, the window upper part 8A and the window lower part 8B are separated from the arm 30 in the upper-lower direction to dismantle the window upper part 8A and the window lower part 8B (the end of step S23).

Further, the pins 57, 58 are removed from the connection part 43 of the arm 30 and the connection receiving part 603 of the mount 60 and from the connection part 44 of the arm 30 and the connection receiving part 604 of the mount 60, to dismantle the arm 30 (step S24). Thereafter the seal 71 is removed (step S25).

Subsequently, the original resin panel is installed in the window frame 162 of the window 16 (step S26).

The mount 60 is dismantled from the seat rails 51, 52 by removing the fasteners (step S27).

The airframe of the aircraft 10 is restored to the state before the measuring device 20 is mounted, by removing the electric wire of the measuring device 20 and the bonding jumper at an appropriate timing in addition to performing the above-described work.

The above-described steps S21 to S27 can be performed in an appropriate order in consideration of the work efficiency etc.

In this embodiment, the window 16 and the seat rails 51, 52, which are pieces of standard equipment, are utilized, and the arm 30 is passed through the airframe through the window 16, and the aerodynamic load applied to the arm 30 and the measuring device 20 is borne by the seat rails 51, 52. Therefore, no large-scale modification is required which involves destroying a part of the airframe to provide an opening for the arm 30 to pass through and reinforcing the structural members of the airframe so as to be able to bear the aerodynamic load around the opening. According to this embodiment, it is possible to easily mount the measuring device 20 onto the airframe, without modification of the airframe, by replacing the resin panel of the window 16 with the window substituting member (window upper part 8A and window lower part 8B) and installing the mount 60 and the arm 30.

Since the mount 60, the seat rails 51, 52, the arm 30, and the window substituting member are detachably connected with one another through fasteners, and the window substituting member can be replaced with the original resin panel using clips in the same manner as replacement of a window panel, the airframe can be easily restored to its original state.

Thus, since the airframe is not modified for mounting the measuring device 20, no restoration work due to modification is incurred.

According to the above description, it is possible to abolish the large-scale modification required for installation of the measuring device 20 and the restoration work due to the modification, and thereby to drastically reduce the labor, cost, and working hours.

Moreover, according to this embodiment, since, as described above, the mount 60, the seat rails 51, 52, the arm 30, and the window substituting member are detachably connected with one another through fasteners, and the window substituting member can be replaced with the original resin panel using clips in the same manner as replacement of a window panel, no trace of the arm 30, the mount 60, and the window substituting member having been provided there is left. In addition, there is no change in strength of the airframe between the airframe before the measuring device 20 is mounted on it and the airframe after the measuring device 20 and the unnecessary members are dismantled from it after a flight test.

Therefore, even the aircraft 10 having been used for a flight test is sufficiently suitable for services with persons and cargoes loaded on it. While a flight test is performed normally on a flight test machine which is manufactured separately from aircrafts used for flight operations, even when it becomes necessary to perform a test for knowing the state of ice accretion on an aircraft already in service, the structure and the method for mounting a device onto the airframe described in this embodiment can be preferably used.

In addition, it is possible to make a selection of the configurations presented in the above-described embodiment or appropriately change the configurations into other configurations within the scope of the present invention.

For example, while the measuring device 20 is installed on the right side of the airframe in the above embodiment, the measuring device 20 can be installed through the arm 30 facing the outside of the aircraft at an arbitrary position such as on the left side, the upper side, or the lower side of the aircraft.

The measuring device 20 can also be provided on the lower side or the upper side of the arm 30.

When it is not necessary to separate the measuring device 20 from the surface of the airframe, the arm 30 does not have to protrude so far from the window 16, and it is also acceptable to provide the measuring device 20 on the arm 30 close to the surface of the window 16 on the outside of the aircraft.

Moreover, when there is a window or a door of a size suitable for the size of the arm 30, the arm 30 can be passed through the opening of the window or the door as is. In this case, there is no need to use the substitute member such as the window upper part 8A and the window lower part 8B. Then, the clearance between the peripheral edge of the opening of the window or the door and the outer periphery of the arm 30 should be sealed.

Figure 12:
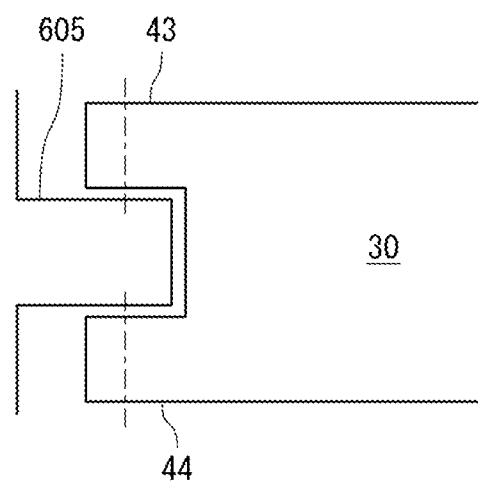
FIG. 12 is a schematic view showing the connection part between the arm and the mount.

Regarding the connection part between the arm 30 and the mount 60, the pair of connection parts 43, 44 (first connection part) of the arm 30 and a single connection receiving part 605 (second connection part) of the mount 60 may be connected with each other as shown in FIG. 12. The pair of connection parts 43, 44 is disposed at a distance in the front-rear direction. The connection receiving part 605 is disposed between the pair of connection parts 43, 44. The connection part 43 and the connection receiving part 605 are connected with each other through a pin, and the connection part 44 and the connection receiving part 605 are connected with each other through a pin. The pins (indicated by the one-dot chain line) extend in the front-rear direction.

In the above-described configuration, too, as described with reference to FIG. 5, the couple of forces F1, F2 is generated in the connection parts 43, 44 on the basis of the moment in the support part of the arm 30, so that the aerodynamic load applied to the arm 30 can be sufficiently diverted to the mount 60.

Contrary to the example shown in FIG. 12, the mount 60 may have a pair of second connection parts and the arm 30 may have a single first connection part disposed between the pair of second connection parts, and each of the pair of second connection parts may be connected with the first connection part. In this case, as the couple of forces F1, F2 is generated in the second connection part on the basis of the moment in the support part of the arm 30, the aerodynamic load applied to the arm 30 can be sufficiently diverted to the mount 60.

Thus, at least one of the first connection part and the second connection part should be composed of a pair of members disposed at a distance in the front-rear direction, and the pair of members should be connected with a mating part, which is either the first connection part or the second connection part, through a pin extending in the front-rear direction.

What is claimed is:

1. An aircraft comprising, as a structure for mounting a device to be installed outside the aircraft onto an airframe:
   a penetration member which penetrates the airframe inwardly and outwardly through an opening included in the airframe, and has a portion to be provided with the device and a portion located inside the aircraft;
   a seat support member which supports a seat disposed inside the aircraft, the seat support member comprising a first rail member and a second rail member disposed in parallel to each other in a front-rear direction along a floor of the aircraft, wherein the first rail member and the second rail member each comprise a plurality of engaging parts at regular intervals along the front-rear direction; and a load transmission member which is connected with the penetration member inside the aircraft and transmits a load input from the penetration member to the seat support member.

2. The aircraft according to claim 1, wherein the opening is formed in a window substituting member which is provided in place of an original window panel in a window frame of a window present in the airframe.

3. The aircraft according to claim 1, wherein the penetration member has a wing shape in transverse section.

4. The aircraft according to claim 1, wherein the device measures physical amounts related to water droplets contained in the atmosphere outside the aircraft.

5. The aircraft according to claim 1, wherein the load transmission member includes: a framework having two first support pillars rising from the first rail member toward the penetration member and two second support pillars rising from the second rail member toward the penetration member; and plate materials constituting side walls provided in the framework.

6. The aircraft according to claim 1, wherein
the penetration member has a first connection part,
the load transmission member has a second connection part connected with the first connection part,
at least one of the first connection part and the second connection part is composed of a pair of members disposed at a distance in the front-rear direction, and
the pair of members is connected with a mating part, which is either the first connection part or the second connection part, through a pin extending in the front-rear direction.

7. The aircraft according to claim 1, wherein
the penetration member has a wing shape in transverse section and has a first connection part,
the load transmission member has a second connection part connected with the first connection part, and
the first connection part and the second connection part are connected with each other through a first pin and a second pin both extending in the front-rear direction and disposed side by side in the upper-lower direction.

8. An aircraft comprising, as a structure for mounting a device to be installed outside the aircraft onto an airframe:
a penetration member which penetrates the airframe inwardly and outwardly through an opening included in the airframe, and has a portion to be provided with the device and a portion located inside the aircraft;

a seat support member which supports a seat disposed inside the aircraft;

a load transmission member which is connected with the penetration member inside the aircraft and transmits a load input from the penetration member to the seat support member;

a seal which seals a clearance defined between the penetration member and an opening forming member which forms the opening; and a retainer which presses the seal against the penetration member and the opening forming member, wherein the penetration member and the opening forming member each have a receiving part for receiving the seal, both receiving parts are disposed in a direction connecting one side and the other side of the clearance across the clearance, and the seal is fixed on only one of the receiving part of the penetration member and the receiving part of the opening forming member.

9. The aircraft according to claim 1, wherein the load transmission member comprises two first support pillars rising from the first rail member and two second support pillars rising from the second rail member, wherein the first support pillars and the second support pillars each have an L-shaped cross-section.

10. The aircraft according to claim 1, further comprising the device, wherein the device measures physical amounts related to water droplets using a laser.

11. The aircraft according to claim 1, wherein the penetration member is connected to the load transmission member with a connecting part and two pins that extend in the front-rear direction through corresponding holes in the connecting part.

12. The aircraft according to claim 1, wherein the plurality of engaging parts are holes spaced at regular intervals along the first and second rail members in the front-rear direction.

13. The aircraft according to claim 5, wherein the side walls couple adjacent ones of the two first support pillars and the two second support pillars.

14. The aircraft according to claim 1, wherein the load transmission member is fixed to the first rail member and the second rail member.

15. The aircraft according to claim 14, wherein the load transmission member is fixed to a corresponding engaging part of the first rail member and a corresponding engaging part of the second rail member.

16. The aircraft according to claim 1, wherein the first rail member and the second rail member support the seat disposed inside in the aircraft.

* * * * *